(12) United States Patent
Leslie et al.

(10) Patent No.: US 11,009,156 B2
(45) Date of Patent: May 18, 2021

(54) COMPOSITE DRILL PIPE

(71) Applicant: Advanced Composite Products & Technology, Inc., Huntington Beach, CA (US)

(72) Inventors: James C. Leslie, Fountain Valley, CA (US); James C. Leslie, II, Mission Viejo, CA (US); James Heard, Huntington Beach, CA (US); Liem V. Truong, Anaheim, CA (US); Marvin Josephson, Huntington Beach, CA (US)

(*) Notice: Subject to any disclaimer, the term of this patent is extended or adjusted under 35 U.S.C. 154(b) by 370 days.

(21) Appl. No.: 15/599,369

(22) Filed: May 18, 2017

(65) Prior Publication Data

US 2017/0343138 A1 Nov. 30, 2017

Related U.S. Application Data

(60) Continuation of application No. 14/251,831, filed on Apr. 14, 2014, now Pat. No. 9,689,514, which is a
(Continued)

(51) Int. Cl.
| | |
|---|---|
| *F16L 15/08* | (2006.01) |
| *E21B 17/00* | (2006.01) |
| *E21B 17/02* | (2006.01) |
| *E21B 17/20* | (2006.01) |
| *F16L 13/10* | (2006.01) |

(Continued)

(52) U.S. Cl.
CPC ............ *F16L 15/08* (2013.01); *E21B 17/003* (2013.01); *E21B 17/028* (2013.01); *E21B 17/206* (2013.01); *F16L 13/103* (2013.01);

*F16L 25/0018* (2013.01); *E21B 17/02* (2013.01); *E21B 17/20* (2013.01); *F16L 31/00* (2013.01); *Y10T 29/49826* (2015.01)

(58) Field of Classification Search
CPC ......... F16L 13/00; F16L 13/10; F16L 13/103; F16L 25/0081; F16L 25/00; F16L 23/12; F16L 23/125; F16L 23/16; F16L 23/165
USPC ........ 285/285.1, 290.1–290.4, 331, 332, 915
See application file for complete search history.

(56) References Cited

U.S. PATENT DOCUMENTS

| | | |
|---|---|---|
| 330,304 A | 11/1885 | Eden |
| 2,045,520 A | 6/1936 | Shepard et al. |

(Continued)

FOREIGN PATENT DOCUMENTS

| | | |
|---|---|---|
| DE | 1188793 B | 3/1965 |
| EP | 226966 A2 | 7/1987 |

(Continued)

*Primary Examiner* — Aaron M Dunwoody
(74) *Attorney, Agent, or Firm* — Fulwider Patton LLP

(57) ABSTRACT

A metal to composite tube joint including an elongated interior fitting constructed with an exterior barrel, reduced in exterior diameter to form a distally facing annular shoulder and then projecting still further distally to form an interior sleeve having a radially outwardly facing bonding surface. An elongated metal outer sleeve formed proximally with a collar constructed for receipt over the barrel and increased in interior diameter and projecting distally to form an exterior sleeve having a radially inwardly facing bonding surface cooperating with the first bonding surface to form an annulus receiving an extremity of a composite tube and a bond bonding the extremity of the tube to the bonding surfaces.

7 Claims, 11 Drawing Sheets

Related U.S. Application Data division of application No. 13/551,446, filed on Jul. 17, 2012, now Pat. No. 8,696,034, which is a continuation of application No. 13/342,952, filed on Jan. 3, 2012, now Pat. No. 8,287,005, which is a continuation-in-part of application No. 12/323,067, filed on Nov. 25, 2008, now abandoned, which is a continuation of application No. 10/952,135, filed on Sep. 28, 2004, now Pat. No. 7,458,617.

(51) Int. Cl.
*F16L 25/00* (2006.01)
*F16L 31/00* (2006.01)

(56) References Cited

U.S. PATENT DOCUMENTS

| | | |
|---|---|---|
| 2,139,745 A | 12/1938 | Goodall et al. |
| 2,301,783 A | 11/1942 | Lee et al. |
| 2,748,358 A | 5/1956 | Johnston et al. |
| 2,920,910 A * | 1/1960 | Schnabel ............ F16L 33/34 285/222.4 |
| 3,318,620 A * | 5/1967 | Cullen ............... F16L 33/01 285/222.5 |
| 3,406,724 A | 10/1968 | Borge et al. |
| 3,467,764 A | 9/1969 | Knapp |
| 3,686,747 A * | 8/1972 | Bagnulo ............ F16L 25/03 29/508 |
| 3,768,269 A | 10/1973 | Broussard et al. |
| 3,784,239 A | 1/1974 | Neher et al. |
| 3,799,587 A | 3/1974 | Chevalier et al. |
| 3,879,097 A | 4/1975 | Oertle et al. |
| 4,120,521 A | 10/1978 | Parmann et al. |
| 4,140,324 A | 2/1979 | Mulas et al. |
| 4,171,560 A | 10/1979 | Garrett et al. |
| 4,220,381 A | 9/1980 | van der Graaf |
| 4,236,386 A | 12/1980 | Yates et al. |
| 4,278,138 A | 7/1981 | Rowley et al. |
| 4,310,059 A | 1/1982 | Moore |
| 4,329,193 A | 5/1982 | Sznopek et al. |
| 4,385,644 A | 5/1983 | Kaempen |
| 4,399,877 A | 8/1983 | Jackson et al. |
| 4,530,379 A | 7/1985 | Policelli |
| 4,548,428 A | 10/1985 | Ruhle |
| 4,614,369 A | 9/1986 | Overath et al. |
| 4,619,470 A | 10/1986 | Overath et al. |
| 4,630,849 A | 12/1986 | Fukui et al. |
| 4,647,078 A | 3/1987 | Lundy et al. |
| 4,649,960 A | 3/1987 | Policelli |
| 4,679,831 A | 7/1987 | Kielminski et al. |
| 4,701,231 A | 10/1987 | Peters et al. |
| 4,706,364 A * | 11/1987 | Aubry ............... B29C 65/00 138/109 |
| 4,786,536 A | 11/1988 | Kaempen et al. |
| 4,799,544 A | 1/1989 | Curlett |
| 4,810,010 A | 3/1989 | Jones et al. |
| 4,813,715 A | 3/1989 | Policelli |
| 4,865,356 A | 9/1989 | Moore et al. |
| 4,872,519 A | 10/1989 | Kopecki et al. |
| 4,889,318 A | 12/1989 | Sisk et al. |
| 4,893,658 A | 1/1990 | Kimura et al. |
| 4,929,002 A * | 5/1990 | Sauer ............... F16L 33/213 285/148.13 |
| 4,968,545 A | 11/1990 | Fellman et al. |
| 5,062,914 A | 11/1991 | Fuchs et al. |
| 5,082,314 A | 1/1992 | Aubry et al. |
| 5,097,870 A | 3/1992 | Williams et al. |
| 5,105,854 A | 4/1992 | Cole et al. |
| 5,148,877 A | 9/1992 | MacGregor |
| 5,188,401 A | 2/1993 | Staniforth |
| 5,211,429 A | 5/1993 | Charlson et al. |
| 5,233,737 A | 8/1993 | Policelli |
| 5,236,018 A | 8/1993 | Kobayashi et al. |
| 5,288,109 A | 2/1994 | Auberon et al. |
| 5,332,049 A | 7/1994 | Tew |
| 5,334,801 A | 8/1994 | Mohn |
| 5,398,975 A | 3/1995 | Simmons |
| 5,443,099 A | 8/1995 | Chaussepied et al. |
| 5,507,346 A | 4/1996 | Gano et al. |
| 5,579,854 A | 12/1996 | Barry |
| 5,685,576 A | 11/1997 | Wolfe et al. |
| 5,713,423 A | 2/1998 | Martin et al. |
| 5,816,344 A | 10/1998 | Turner et al. |
| 5,895,079 A | 4/1999 | Carstensen et al. |
| 5,908,049 A | 6/1999 | Williams et al. |
| 5,913,337 A | 6/1999 | Williams et al. |
| 5,921,285 A | 7/1999 | Quigley et al. |
| 5,927,409 A | 7/1999 | Turner et al. |
| 5,944,124 A | 8/1999 | Pomerlau et al. |
| 5,988,695 A | 11/1999 | Corbett et al. |
| 6,113,159 A | 9/2000 | Corbett et al. |
| 6,186,558 B1 | 2/2001 | Komolrochanapom |
| 6,244,631 B1 | 6/2001 | Payne et al. |
| 6,315,002 B1 | 11/2001 | Antal et al. |
| 6,318,761 B1 * | 11/2001 | Robertson ............ F16L 21/007 285/31 |
| 6,367,564 B1 | 4/2002 | Mills et al. |
| 6,378,633 B1 | 4/2002 | Moore et al. |
| 6,641,434 B2 | 11/2003 | Boyle et al. |
| 6,670,880 B1 | 12/2003 | Hall et al. |
| 6,688,396 B2 | 2/2004 | Floerke et al. |
| 6,734,805 B2 | 5/2004 | Johnson |
| 6,830,467 B2 | 12/2004 | Hall et al. |
| 6,866,306 B2 | 3/2005 | Boyle et al. |
| 6,913,093 B2 | 7/2005 | Hall et al. |
| 7,002,445 B2 | 2/2006 | Hall et al. |
| 7,064,676 B2 | 6/2006 | Hall et al. |
| 7,080,998 B2 | 7/2006 | Hall et al. |
| 7,093,654 B2 | 8/2006 | Hall et al. |
| 7,168,510 B2 | 1/2007 | Boyle et al. |
| 7,201,240 B2 | 4/2007 | Hall et al. |
| 7,277,026 B2 | 10/2007 | Hall et al. |
| 7,299,867 B2 | 11/2007 | Hall et al. |
| 7,413,021 B2 | 8/2008 | Madhavan et al. |
| 7,535,377 B2 | 5/2009 | Hall et al. |
| 2004/0043825 A1 | 3/2004 | Horwood et al. |
| 2007/0102197 A1 | 5/2007 | Rotthaeuser |
| 2008/0012569 A1 | 1/2008 | Hall et al. |
| 2008/0251247 A1 | 10/2008 | Flint et al. |
| 2009/0038849 A1 | 2/2009 | Braden et al. |
| 2009/0058675 A1 | 3/2009 | Sugiura |
| 2009/0151926 A1 | 6/2009 | Hall et al. |
| 2010/0175890 A1 | 7/2010 | Bray et al. |
| 2011/0042072 A1 | 2/2011 | Villegas et al. |

FOREIGN PATENT DOCUMENTS

| | | |
|---|---|---|
| EP | 264446 A1 | 4/1988 |
| EP | 266810 A2 | 5/1988 |
| EP | 292998 A1 | 11/1988 |
| EP | 361639 A2 | 4/1990 |
| FR | 2656403 A1 | 6/1991 |
| GB | 1522240 A | 8/1978 |
| WO | 9917045 A1 | 4/1999 |

* cited by examiner

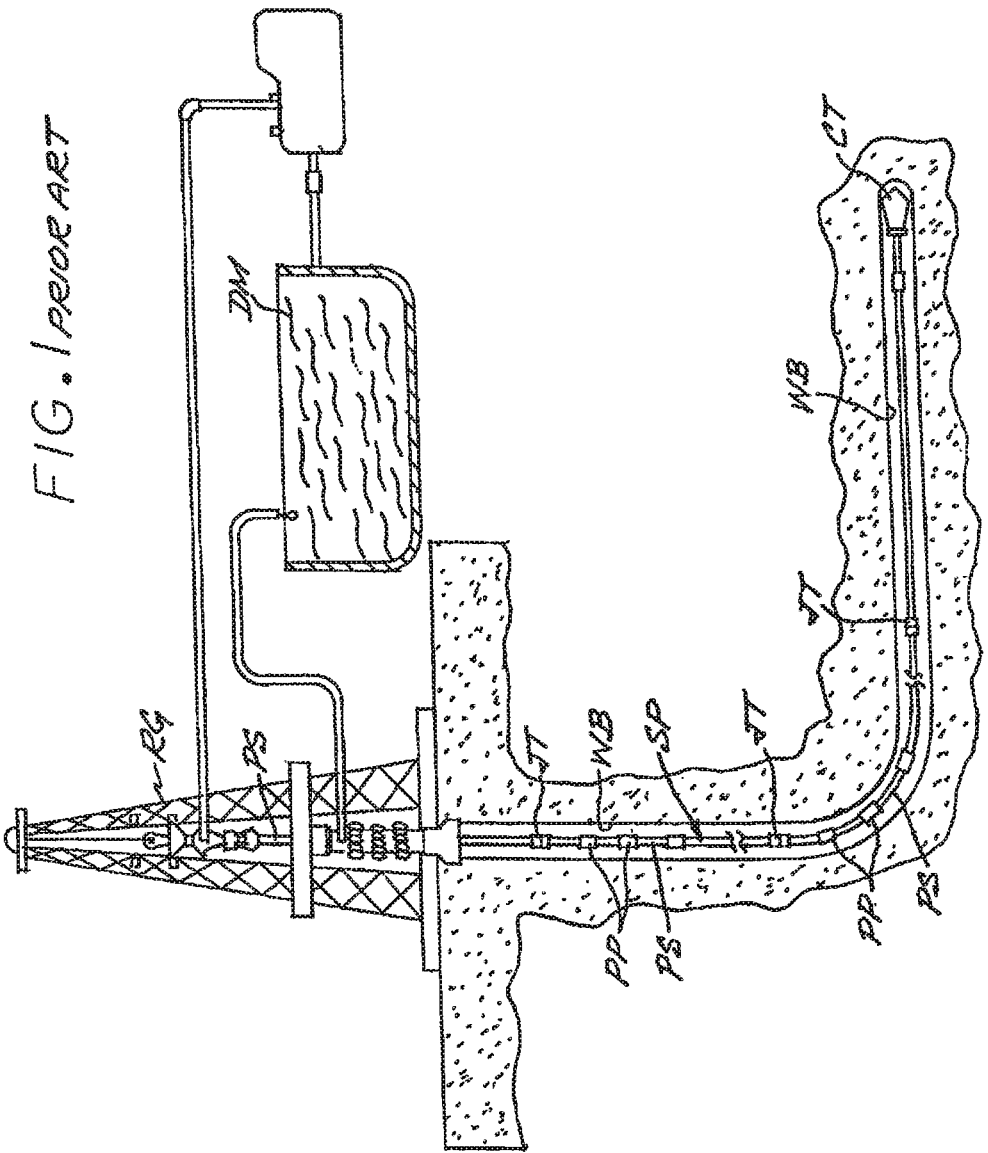

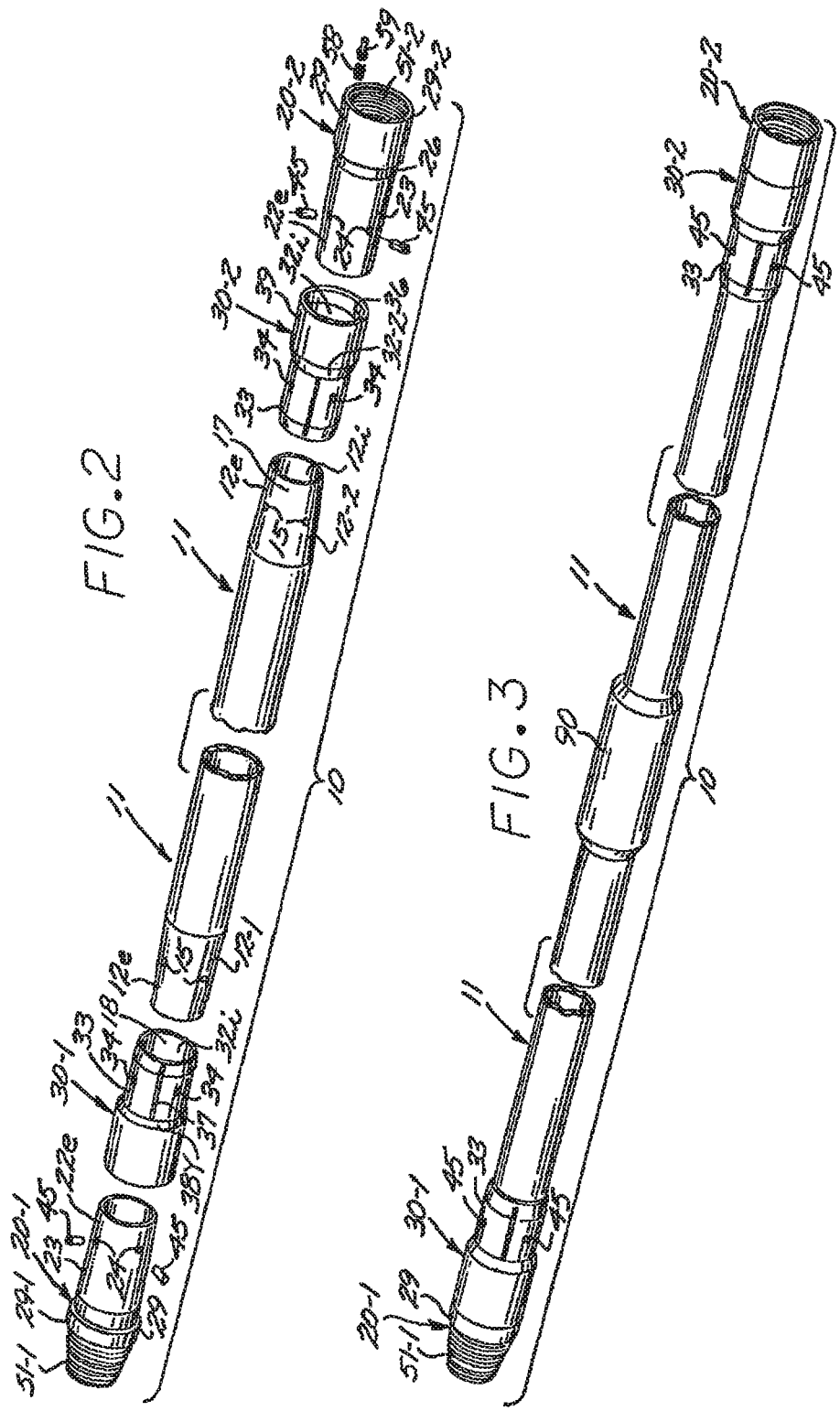

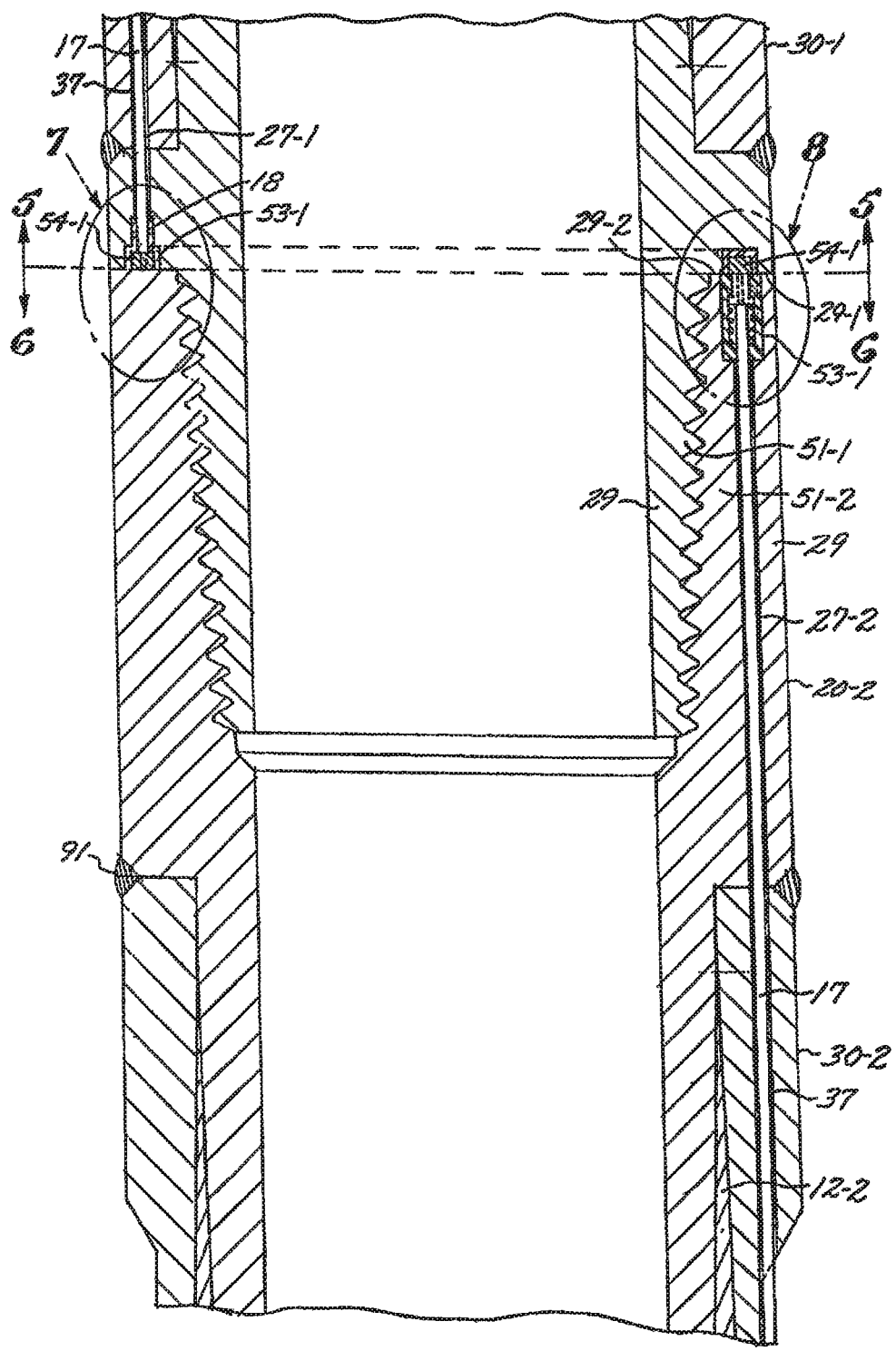

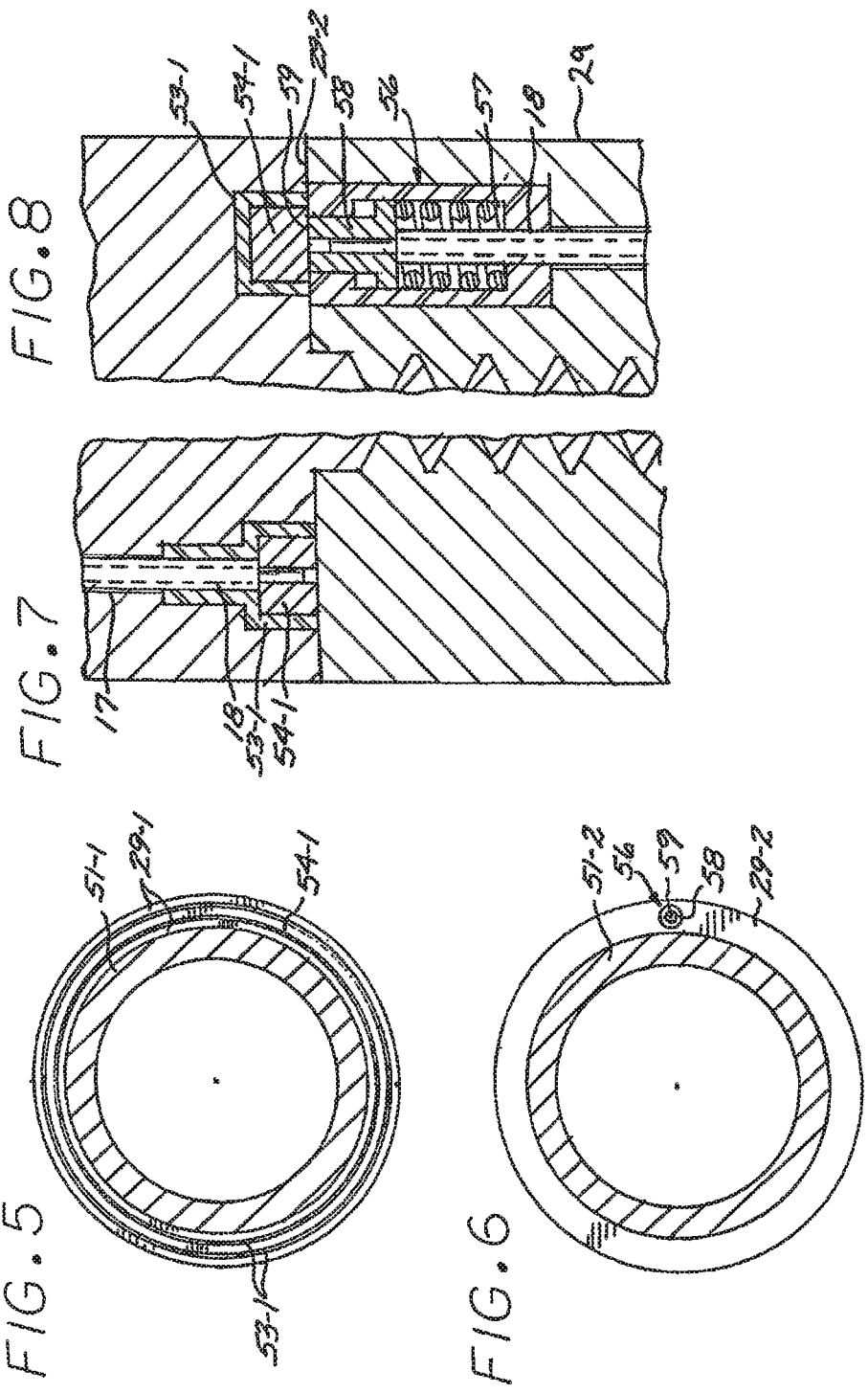

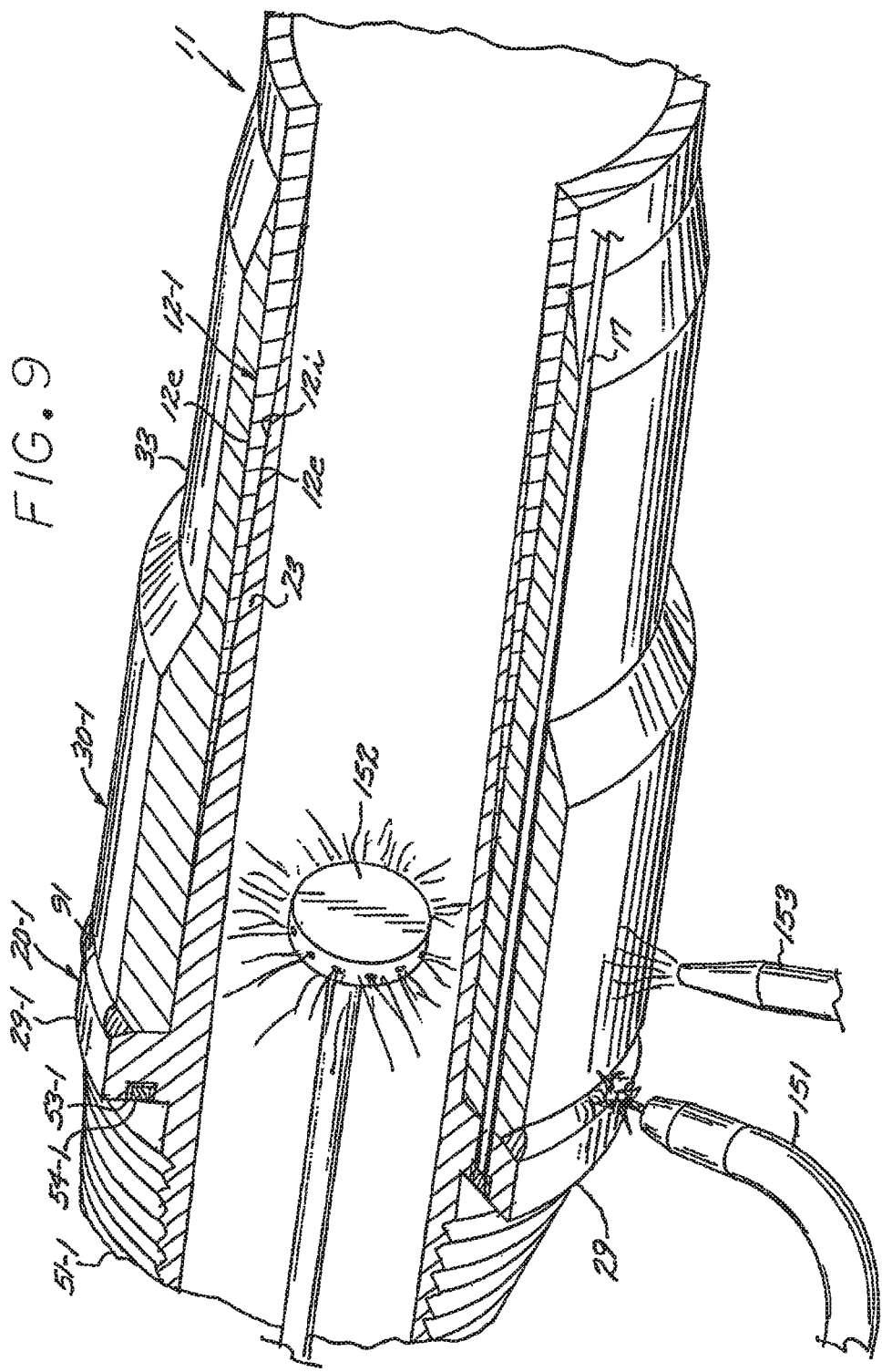

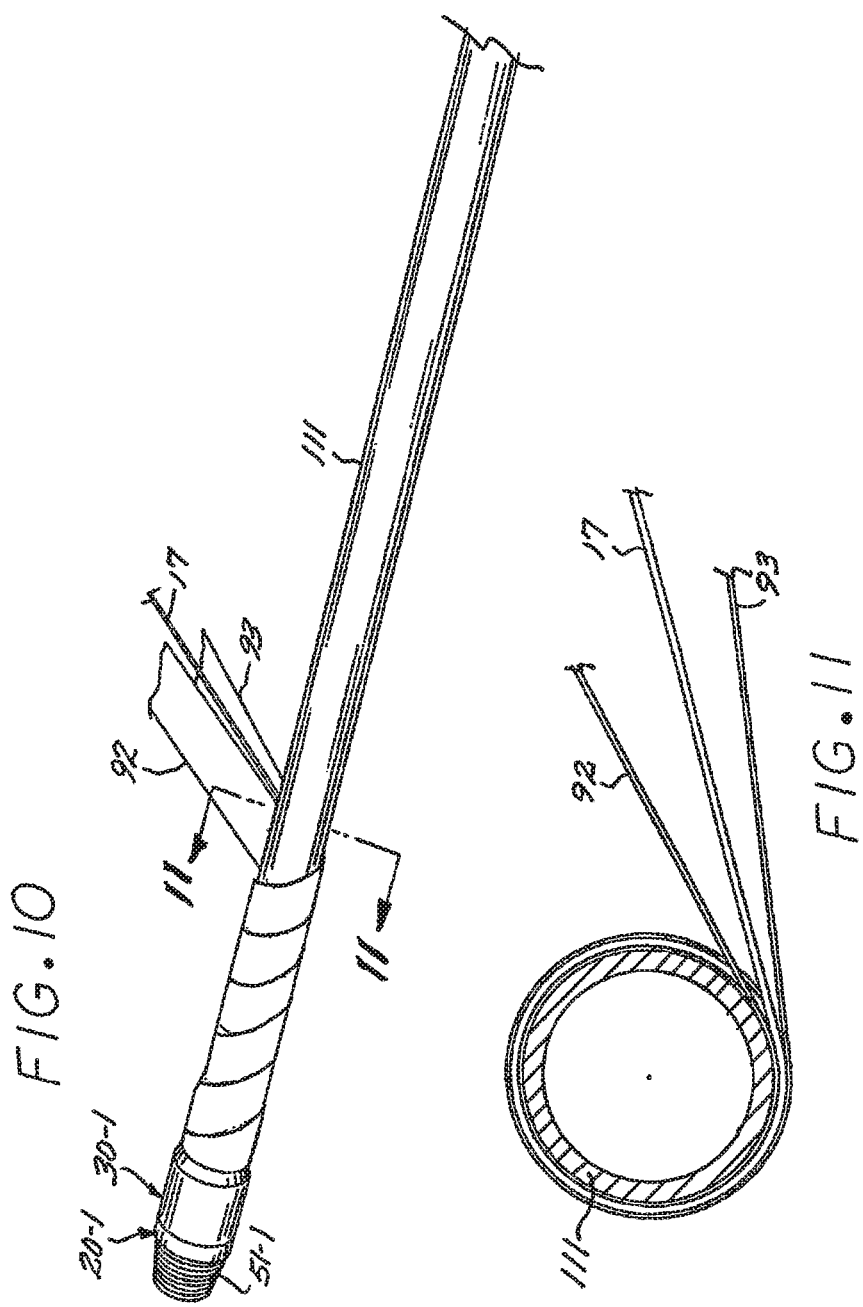

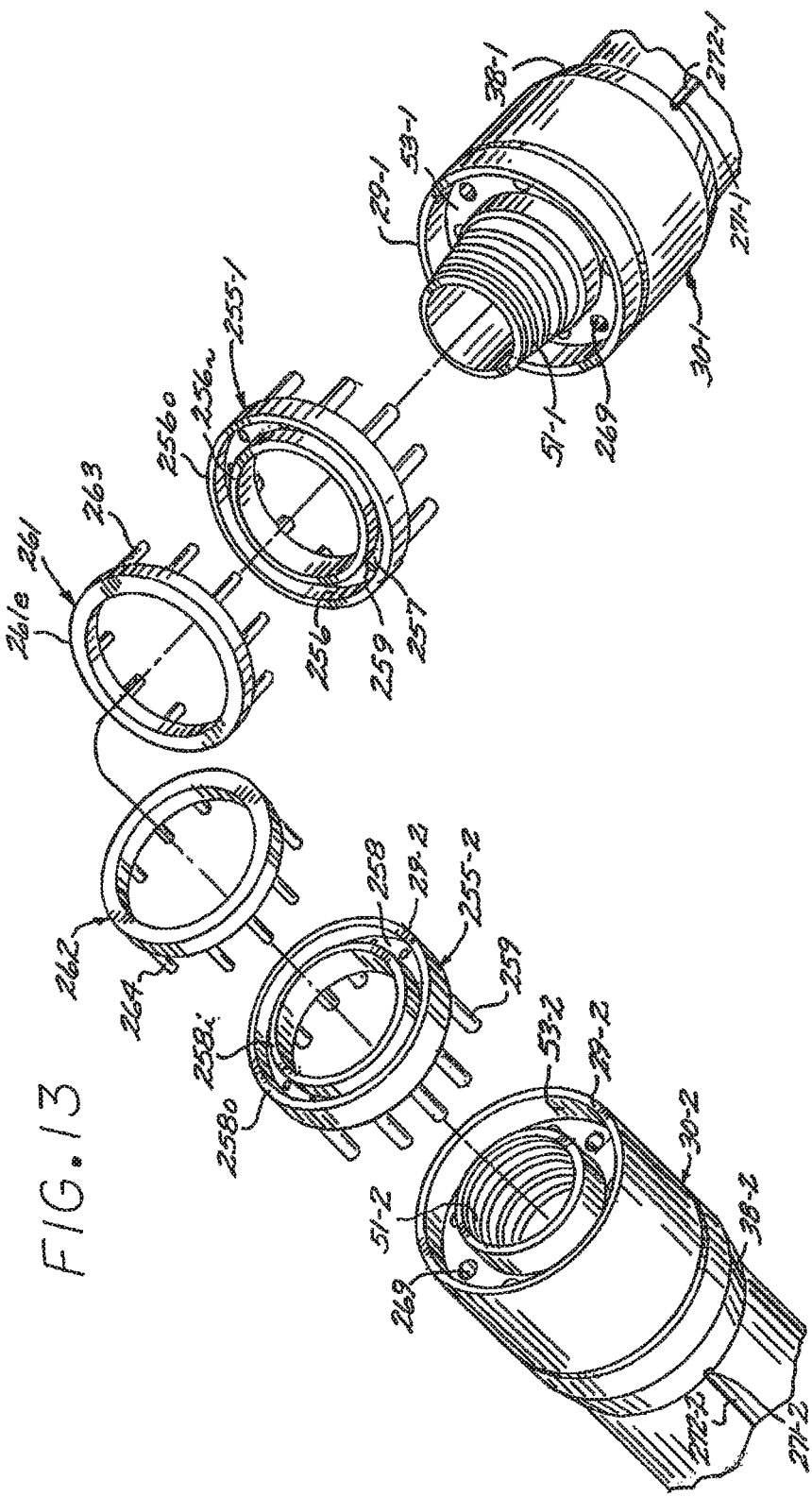

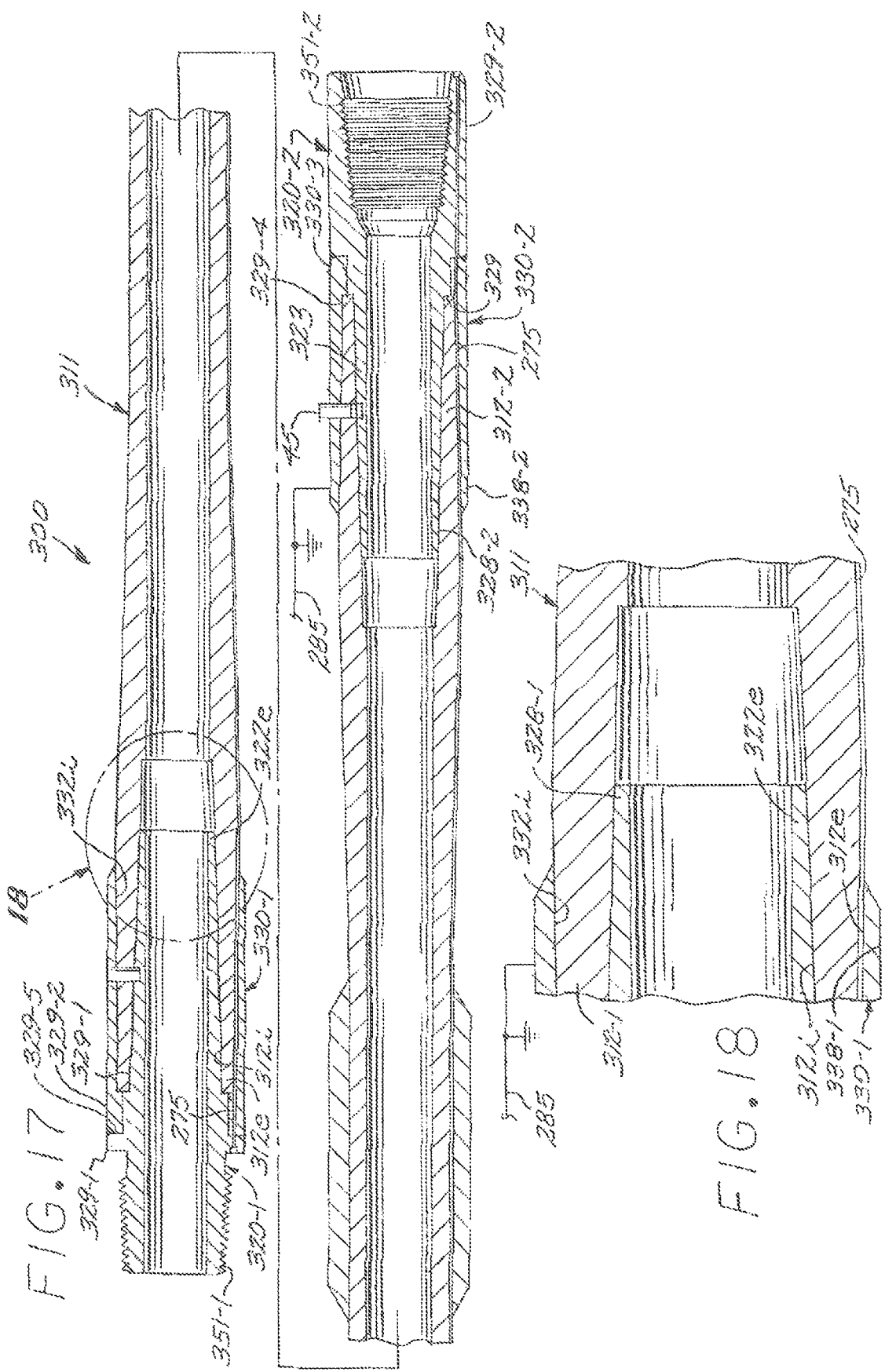

COMPOSITE DRILL PIPE

CROSS-REFERENCES TO RELATED APPLICATIONS

The teachings herein constitute continuation of U.S. patent application Ser. No. 14/251,831 filed Apr. 14, 2014, which is a divisional application of U.S. patent application Ser. No. 13/551,446 filed Jul. 17, 2012, now U.S. Pat. No. 8,696,034, which is a continuation of U.S. patent application Ser. No. 13/342,952 filed Jan. 3, 2012, now U.S. Pat. No. 8,287,005, which is a continuation of U.S. patent application Ser. No. 12/323,067 filed Nov. 25, 2008, which is a continuation-in-part of the matter disclosed in U.S. patent application Ser. No. 10/952,135 filed Sep. 28, 2004, now U.S. Pat. No. 7,458,617, and the benefit of these earlier filing dates being claimed and the content thereof incorporated herein by reference as though fully set forth hereon.

STATEMENT OF GOVERNMENT INTEREST

This invention was partly funded by the Government of the United States of America under Cooperative Agreement No. DE-FC26-99FT40262 awarded by the U.S. Department of Energy and the Government of the United States of America has certain rights in the invention.

BACKGROUND OF THE INVENTION

Field of the Invention

The present invention relates to composite torque tubes and the method for forming the same.

The Prior Art

Composite tubes have long been recognized for their light weight and torque transmitting capabilities. To realize the full benefit of the torque carrying capacity it is necessary that the remaining components of the torque transmitting string be especially strong.

The inherent difficulty in forming a high integrity interface between a composite tube and the adjoining surfaces has long been recognized. It has been common practice to form a joint with a mutual fitting or sleeve having a shell with a single surface abutting the wall of the composite torque pipe. This arrangement provides a single interface for bonding, sometimes referred to as a single shear lap joint, a method of forming a joint of this type is shown in U.S. Patent Appl. No. 2005/013783 to Williams. These single lap joints fail to provide the integrity necessary to carry high torque loads without failure.

In the past, fitting assemblies with variously opposing surface geometries have been proposed to effect a secure capture of the composite end of a torque pipe within the fitting. Some examples of making, such end fittings include those taught in U.S. Pat. No. 4,421,497 to Fiderman; U.S. Pat. No. 5,233,737 to Policelli; U.S. Pat. No. 4,810,010 to Jones; U.S. Pat. No. 6,315,002 to Antal et al.; and others. While suitable for the purposes intended each of the foregoing assemblies include threaded or otherwise releasably engaged parts clamping or compressing the composite between each other with inherently uneven load concentrations resulting in highly uneven shear stresses. This uneven load distribution between adjacent parts, of course, results in correspondingly uneven local strain deformations when exposed to the various high loadings in the course of use. There is therefore an inherent incidence of local bond separation between the composite itself and the adjoining fitting surface, with some consequence for failure.

Artisans have recognized that the high torque loads applied to drive shafts cannot be adequately carried by previous proposals for wrapping filament bundles around circumferential grooves on a sleeve periphery and proposed a method for employing a tubular sleeve with longitudinal knurls, U.S. Pat. No. 4,238,539 to Yates. Devices by this method are expensive to make and fail to provide the requisite load carrying capability for many high torque applications.

Efforts to enhance joint strength have led to proposals that the interference between an end fitting and pipe be splined or grooved longitudinally or circumferentially for receipt as a bond. Approaches of this type are shown in U.S. Pat. No. 4,830,409 to Freeman, U.S. Pat. No. 4,952,195 to Taylor and U.S. Pat. No. 5,601,494 to Duggar. Joints made by these methods fail to provide smooth, uniform interfaces to enhance the bond strength and distribute stress uniformly over the joint interface.

Alternatively, end fitting assemblies have been proposed in which radial pins or other radial fasteners are added to the assembly, as exemplified by the teachings of U.S. Pat. No. 5,332,049 to Tew; U.S. Pat. No. 5,288,109 to Auberon et al.; U.S. Pat. No. 5,443,099 to Chaussepied et al.; and others. Once again, while a change is realized from these radial interconnections the essentially separated nature of a single metal to composite surface interface is also susceptible to uneven load transfer with the consequent local separations an inherent possibility. For example, the '049 patent to Tew appears to disclose a single metal-composite interface held together by radial pins and an adhesive bond which may suffer from disparate torsional forces. Tew appears to propose a cylindrical outer protective sheath drawn over the pipe and lacking a tapered surface interface and suffers the shortcoming that, the coupling itself fails to provide a high strength joint capable of carrying the high torsional force necessary to withstand the loads of both extended reach applications and short radius.

It can be seen then that a need exists for a lightweight and durable structure capable of withstanding the rigors of deep and directional drilling.

SUMMARY OF THE INVENTION

Briefly and in general terms, in one aspect the present invention is directed to a composite to metal joint for connecting composite torque pipe to a mechanical end fitting. The device is a metal inner sleeve configured with a barrel and sleeve projecting from an annular flange to define on its exterior a distally narrowing conical shell surface. One end of an exterior sleeve is telescoped over the barrel and is formed with a distally projecting outer shell formed with an interior smooth conical inner shell surface concentric with the inner shell itself and cooperating therewith to form an annulus distally expanding in radial thickness, a composite torque pipe is formed with an extremity formed with a concentrically tapered connector ring configured to compliment the shape of the annulus. The ring is inserted in the annulus and a bonding material is applied to the interface between the sleeve surfaces and the connector ring and allowed to cure.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 1 is a perspective illustration, separated by parts, of a conventional drill pipe string extended into a well bore;

FIG. 2 is an exploded perspective illustration, partially in section, of the metal to composite end fitting assembly embodying the pipe assembly;

FIG. 3 is a further perspective illustration of the pipe assembly incorporating the parts illustrated in FIG. 2;

FIG. 4 is a sectional view, of a coupled pipe joint illustrating the signal connection between pipe parts shown in FIG. 2;

FIG. 5 is an enlarged end view taken along the line 5-5 shown in FIG. 4.

FIG. 6 is an enlarged end view taken along the line 6-6 shown in FIG. 4.

FIG. 7 is a side view, enlarged of the circle shown in FIG. 4.

FIG. 8 is a side view, enlarged of the circle shown in FIG. 4.

FIG. 9 is a perspective illustration, in partial section, of the tooling arrangement useful in combining the inventive assembly into an integral fixture;

FIG. 10 is a diagrammatic view, in perspective, illustrating the inventive implementation of a forming facility useful in forming the composite pipe segment on a rotary mount incorporating portions of the end fitting assembly;

FIG. 11 is an enlarged cross sectional end view taken along the line 11-11 of FIG. 10;

FIG. 13 is a perspective exploded illustration, of a second embodiment of the metal to composite end fitting of the present invention and showing an electrical contact mechanism bridging electrical conduction across a threaded pipe joint;

FIG. 17 is a broken longitudinal sectional view of a third embodiment of the pipe assembly shown in FIG. 3; and FIG. 18 is a detailed view in enlarged scale taken from the circle 18 shown in FIG. 17.

DETAILED DESCRIPTION OF THE PREFERRED EMBODIMENTS

Figure 12:
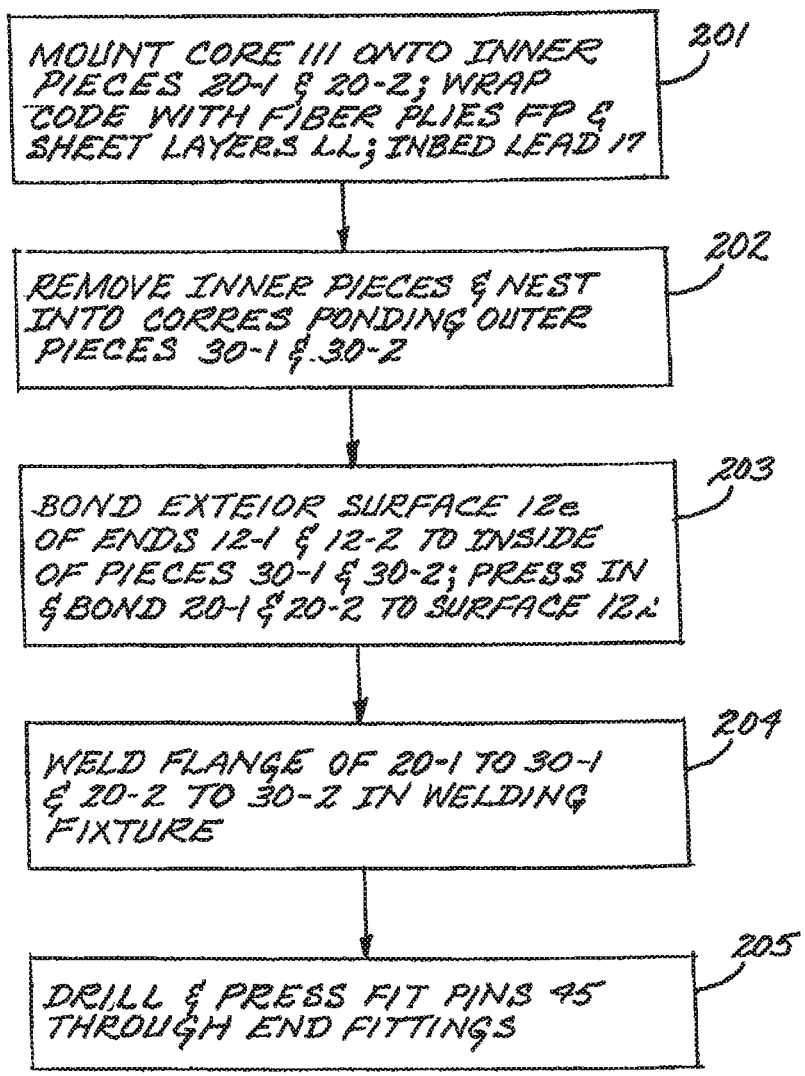
FIG. 12 is a sequence diagram of an end fitting assembly sequence in accordance with the present invention.

As shown in FIG. 1 current drilling practices depend on a string SP composed of drill pipe segments PS connected end-to-end to turn a cutting tool CT mounted on the lower string end. In the course of such turning, the tool CT grinds and penetrates through the bottom of the well bore WB with the particulates continuously brought out to the surface by a circulating flow of drilling mud DM pumped into the bore to equalize bore pressures. As readily available formations are depleted these drilling projects now extend to much greater depth, and/or greater lateral reach, with the weight of the pipe string SP and/or its friction load in the well bore setting the practical exploration limits. The complexity of a drilling rig RG conformed for such long reach drilling is enormous and the logistics of its movement alone, encourage directional capability along with an increasing pipe string. This same complexity of the rig also determines the manipulation convenience of each of the pipe segments PS, again resulting in its own logistic and mechanical constraints resolved by the size of the rig (or off-shore platform) that can be effectively implemented at the well site, thereby limiting the length of each segment PS and multiplying the number of required joints JT that need to be made to extend the string to the desired depth. The combined weight of the string, including all the down hole joints and any wear knots or pipe protectors 90 shielding the pipe from wall contact, along with the friction load resulting from this wall contact, are thus resolved at the last surface joint which sets the design limit. It is within this limit that the rig operator tries to discover oil by periodic insertion of instruments down the bore, or simply by inspecting the drilling debris brought to the surface.

In addition to the above physical concerns there are also those imposed by various laws and ordinances dealing with the environment. There is currently substantial public resistance to the equipment clutter associated with crude oil production appearing in one's neighborhood, further promoting directional drilling, a technique that compounds torsional loading as very long drill pipe strings are turned while resting on the wall of the well. This same technique also demands shorter radius turns, or a more flexible pipe, and also accurate instrumentation to inform the operator of the actual direction that is being drilled and of any formation details that are encountered. For all these reasons light weight, high strength, but elastic pipe is desired, particularly if signal and power conductors can be combined therewith. All these concerns are now substantially resolved in the inventive structure and process described by reference to FIGS. 2-18.

By particular reference to FIGS. 2-4 one aspect of the inventive pipe assembly, generally designated by the numeral 10, comprises a tubular composite pipe segment 11, formed by winding up reinforcing fiber, such as carbon fiber, preferably wound in stress determined orientation patterns between plies of interleaved wrapping, all bonded together by resinous filler to form a cylindrical structure of a generally uniform wall thickness over most of its length.

Pipe segment 11 may be formed with a generally uniform taper along a selected portion of each end 12-1 and 12-2 reducing in wall thickness. Each end may be defined by interior and exterior wall surfaces 12*i* and 12*e* respectively, that are configured for receipt within conforming annular cavities formed by male and female couplers comprising a set of nested metallic end fittings 20-1 and 20-2 and metallic sleeves 30-1 and 30-2. Those skilled in the art will appreciate that the surfaces of the pipe segment and adjoining structures for that matter, may use other surface configurations, yet, in one embodiment, tapered and frustoconical surfaces are used permitting a diffusion of torsional loads across the surfaces of connected pieces.

The metallic end fittings 20-1 and 20-2 include a flange 29 with shoulders 29-1 and 29-2 and skirt 23 including an exterior surface 22*e* tapering in reducing cross section away from the flange.

The metallic sleeves 30-1 and 30-2 include respective telescoping flanges 39 and skirts 33 formed with interior surfaces 32*i* tapering and expanding cross section away from the flange to, when assembled with the respective fittings 20-1 and 20-2 cooperate in defining an annulus distally expanding in thickness (FIG. 9).

The annular cavities formed by the nested pieces are formed by axially aligning the tapered exterior surface 22e of skirt 23 adjacent an oppositely tapered surface 32i on the skirt 33 interior. The surfaces 22e and 32i are each closely matched to respective dimensions and tapered surfaces 12e and 12i where insertion of the surfaces 12e and 12i into the annular cavity forms an aligned pipe segment end interface. Those skilled in the art will appreciate that this self-aligning construction creates a bonding interface that can be effected by any high temperature epoxy resin and will further appreciate that the close fit of this bond is further enhanced by close dimensional matching between the coaxially nested end fitting and sleeve pieces so that the sleeve forms a peripheral support for the tapered end of the pipe segment as it is slid into position within the end fitting.

In addition, each of the skirts 23 and 33, moreover, may include a radially matched set of lateral openings 24 and 34 dimensioned for press fit or interference receipt of corresponding optionally used pins 45 that also pass through corresponding circular openings 15 formed in the tapered ends 12-1 and 12-2 once the ends are fully received, bonded and indexed within their receiving cavities. This same indexed alignment may orient the exposed ends 18 of conductor leads 17 that are woven into the filament matrix of the pipe segment 11 into alignment with longitudinal drillings 37 formed in skirts 33 to effect an electrical connection across the pipe joint herein described. Beyond this bonding receipt, each of the pieces is formed as a closely dimensioned telescoping cylindrical segments 26 and 36 which are each provided with corresponding exterior flanges 29 and 39 aligned next to each other when the skirts are properly positioned. Of course, the same drillings 37 extend through the flange 39 to convey the lead ends 18 therethrough.

Those skilled in the art will appreciate that while pieces 20-1 and 20-2, and also pieces 30-1 and 30-2, are described above by identical descriptions, in application one of the nested end piece sets serves as the male portion of the threaded joint, otherwise referred to as the 'pin end', and the other end piece set serves as the female threaded, or the 'box end'. Accordingly, those parts of the end fitting pieces 20-1 and 20-2 that are exterior of flanges 29 are of necessity different depending on the joint function that is formed. Thus end fitting 20-1 includes a threaded boss 51-1 extending beyond the exterior shoulder 29-1 of the flange 29 that is conformed for threaded receipt in a threaded cavity 51-2 formed in the other exterior shoulder 29-2 of the other flange 29 on the end fitting piece 20-2. Each of the flanges 29, moreover, includes drilling continuations shown as drillings 27-1 and 27-2 (FIG. 4) aligned with drillings 37, drilling 27-1 conveying the conductor end 18 into a circular recess 53-1 formed in the flange shoulder surface 29-1 where the lead is connected to an insulated ring 54-1 conformed for receipt within the interior of recess 53-1.

In an exemplary assembly, the overall length of the pipe assembly 10 measures approximately 359 inches. In this assembly, the composite pipe 11 measures 338.00 inches long between respective outer sleeve proximal ends 30-1 and 30-2 and includes an inner diameter of 1.625 inches and an outer diameter of 2.510 inches intermediate the end assemblies. The diameters expand outwardly therefrom toward the assembly fittings where the pipe inner surface 12i and exterior surface 12e respectively are formed with radial dimensions matching their confrontment with end fitting exterior surface 22e and sleeve inner surface 32i respectively. The overall pipe string diameter expands from the composite pipe 11 outer diameter of 2.510 inches to a metallic fitting end diameter of 3.405 inches. The length of the "pin" end assembly measures approximately 10.00 inches from the distal end of male boss 51-1 to the outer sleeve 30-1 proximal end. The "box" end assembly measures approximately 1.00 inch longer between respective like features of female boss 51-2 and sleeve end 30-2 to accommodate the male boss 51-1. Thus, it will be appreciated that the metal to composite conjunction is useful in extended reach applications by providing a diffusion of loads across the joint interface.

During operation in extended reach drilling applications, as pipe strings drill deeper into earth using longer strings, the greater the weight of the string becomes, thus promoting drag and inhibiting drilling performance and efficiency. Greater weight contributes to increasing tensile strength loads under the increasing pressures of deep extended reach drilling environments pulling and stretching on the pipe assembly components, and in particular, tugging on joints where tensile loads can separate parts. As will be appreciated, the length of the drill string of the presently described embodiment is approximately 86% composite material length compared to approximately 14% metallic material length. The metal is primarily reserved for the end fittings 20 and sleeves 30 that support the joint interface to the composite pipe segment 11 and provide strengthened joint coupling between adjacent pipe assemblies where tensile loads can do significant harm. Furthermore, to aid in drilling extended distances, it will be understood that as the composite layers are formed, additional carbon material may be added to strengthen the tensile load capacity of drill strings. The composite pipe 11 walls may also be conveniently adjusted to thicker or thinner thicknesses depending on the depth of drilling by forming the pipe segments with more or less composite layers.

It will be appreciated that the drill string is conducive to carrying torsional loads by both the internal fitting to composite wall interface and by the metallic outer sleeve. In operation, as the drill pipe string turns, force loads are distributed along the walls of the drill pipe assembly and are diffused over pipe walls expanding from the intermediate portion toward the joint assembly interfaces and ends. When loads propagate toward the joint assemblies, these loads encounter the dual tapered surface interface between the metallic end fittings 20 and metallic sleeves 30 confronting the composite pipe disposed intermediately there-between distributing the loads across two surfaces interfaces. As torsional forces encounter the first tapered interface between the metallic end fitting and composite pipe, the tapered surfaces create a larger area of load confrontment thereby diffusing the load effects over a greater surface area. Those skilled will appreciate that this effect is enhanced by a second tapered interface between the composite pipe and sleeve tapered surfaces where the loads once again encounter an extended surface area diffusing the loads a second time as the outer sleeve carries part of the load. As such, drill assemblies for long reach with the proposed configuration can be assembled in strings beyond 35,000 feet in length.

Referring to FIGS. 5-8, end fitting 20-2 includes a drilling 27-2 indexed with drilling 37 in the sleeve 30-2 to convey the other conductor end 18 into a manifold 56 (FIG. 8) formed in flange 29 and terminating in one or more openings 57 through shoulder surface 29-2 opposing the recess 53-1 when the ends are threadably mated. Opening 57, may in turn, be provided with a spring biased piston 58 carrying a bayonet point 59. Referring to FIG. 5, a sectional end view of the "pin" end is illustrated showing the insulated contact ring 54-1 circumscribed within the circular recess within the flange 29-1. The assembly of circular features in FIG. 5 are shown in relation to the features of FIG. 6 where the spring-biased piston and bayonet point on the "box" end in manifold 56 are in circumferential alignment to the ring. Once the bosses 51-1 and 51-2 are joined together, it is then useful to pressurize the manifold interior, advancing the piston against the spring bias to drive the bayonet point through the insulation on the opposingly aligned contact ring. In this manner, one example of circuit continuity is effected between the conductors 17 imbedded in the joined segments regardless of their relative orientation.

Those in the art will further appreciate that the foregoing arrangements are particularly suited for custom forming of composite pipe segments 10 by way of the nested end fittings described herein. By particular reference to FIGS. 9-12, the fitting end pieces 20-1 and 20-2 may be combined with a forming mandrel effected by an inner core layer 111 (FIG. 10), to form the turning core for the subsequent winding of fiber plies 92 and the remaining interleaved layers 93 forming the composite pipe 11, in step 201. In this step the winding pitch, fiber density and the selection of any sealing wraps may also be determined by the particular parameters of the well and the mandrel structure may be further stiffened and assisted by internal pressurization while the fiber wind-up tension is controlled. Of course, conductive leads 17 may be concurrently also imbedded into the wrap, again in accordance with the type and nature of the signals and/or power that may be conveyed thereon. Once the structural conditions are met the end fittings are withdrawn from the core layer and thereafter nested in the sleeve pieces 30-1 and 30-2 in step 202.

A bonding agent, such as a high temperature epoxy resin is then applied to the pipe ends tapered rings defining the pipe ends 12-1 and 12-2 and the ends are then re-positioned into the interiors of sleeve pieces 30-1 and 30-2 with the end fitting pieces 20-1 and 20-2 then pressed into their common interiors, shown as the self-centralizing step 203. In the course of this same step the exposed conductor ends 18 are conveyed into their appropriate drillings to be thereafter connected either to the bayonet contact 59 or the contact ring 54-1. In step 204 the foregoing assembly is then brought into a spray cooled welding fixture illustrated in FIG. 9 in which a weld 91 is applied by a welding device 151 to join the exterior flanges of the nested pieces 20-1 and 30-1 to each other (and by the same example also the nested pieces 20-2 and 30-2) while water spray heads 152 and 153 cool the adjacent structure. Optionally, once fixed by their flanges, the sleeve and end pieces, with the ends 12-1 and 12-2 captured there-between, are then drilled, in step 205, with perforations 34 which thereafter receive press fit pins 45.

In this manner a self-centralized end arrangement is useful both in the manufacturing and also in effecting a closely held bond interface between the high strength metal end pieces and the composite pipe segment with the interface further stabilized and fixed by welding and press fit pins. Simultaneously, this manner of manufacture also provides a durable, convenient and effective manner of incorporating a conductor into the pipe fully protected by the pipe pieces. The resulting high strength joint is then further complemented by the appropriately selected wind-up pitch, weave density and interleaving that are selected for the particular task. Thus, the fabrication and the ending structure are rendered both highly effective and convenient.

It will also be appreciated that the aforedescribed drill pipe string may be improved upon to include enhanced configurations for effecting an electrical connection along the pipe string and modifications to the composite-metal interface providing a durable yet flexible structure conducive to short radius drilling.

Figure 15:
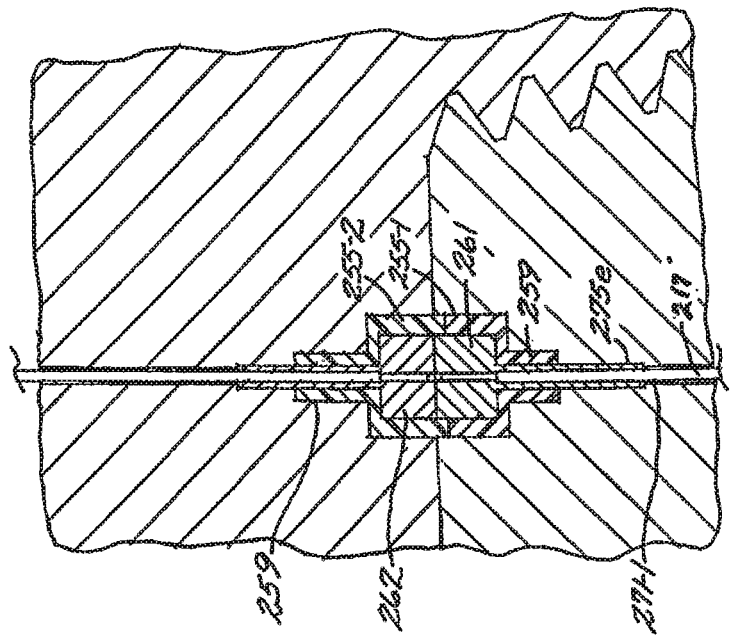
FIG. 15 is an enlarged sectional detail view of the contact mechanism shown generally in FIG. 13 after the full threaded engagement of a pipe joint.
Figure 14:
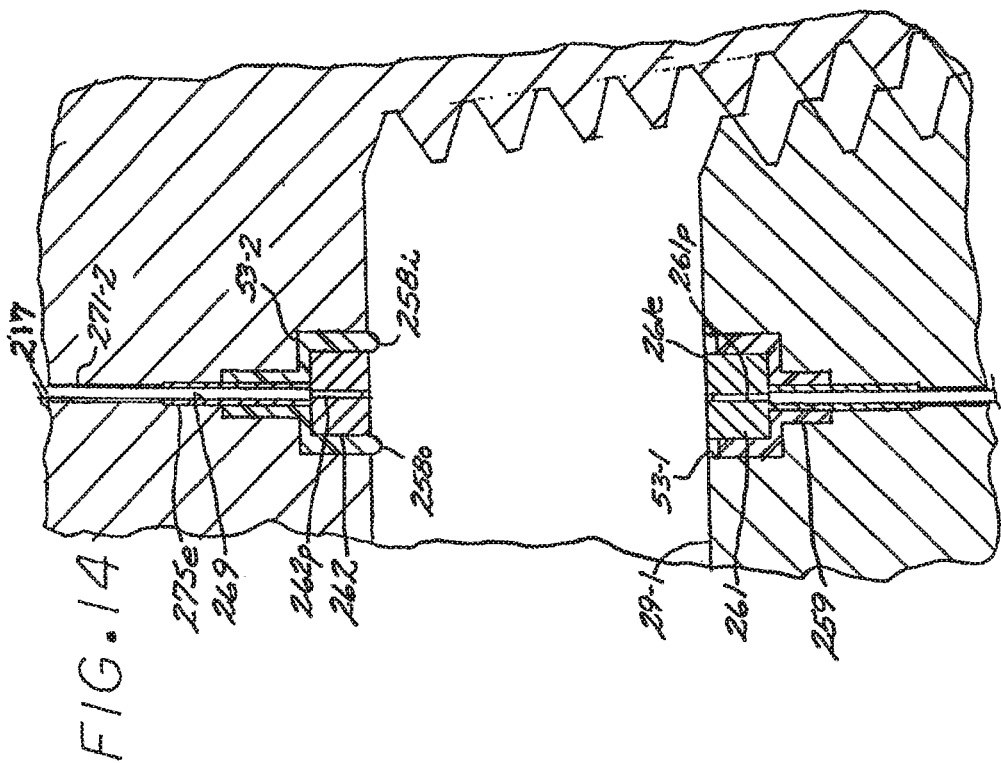
FIG. 14 is an enlarged sectional detail view of the contact mechanism shown generally in FIG. 13 before the full threaded engagement of a pipe joint.
Figure 16:
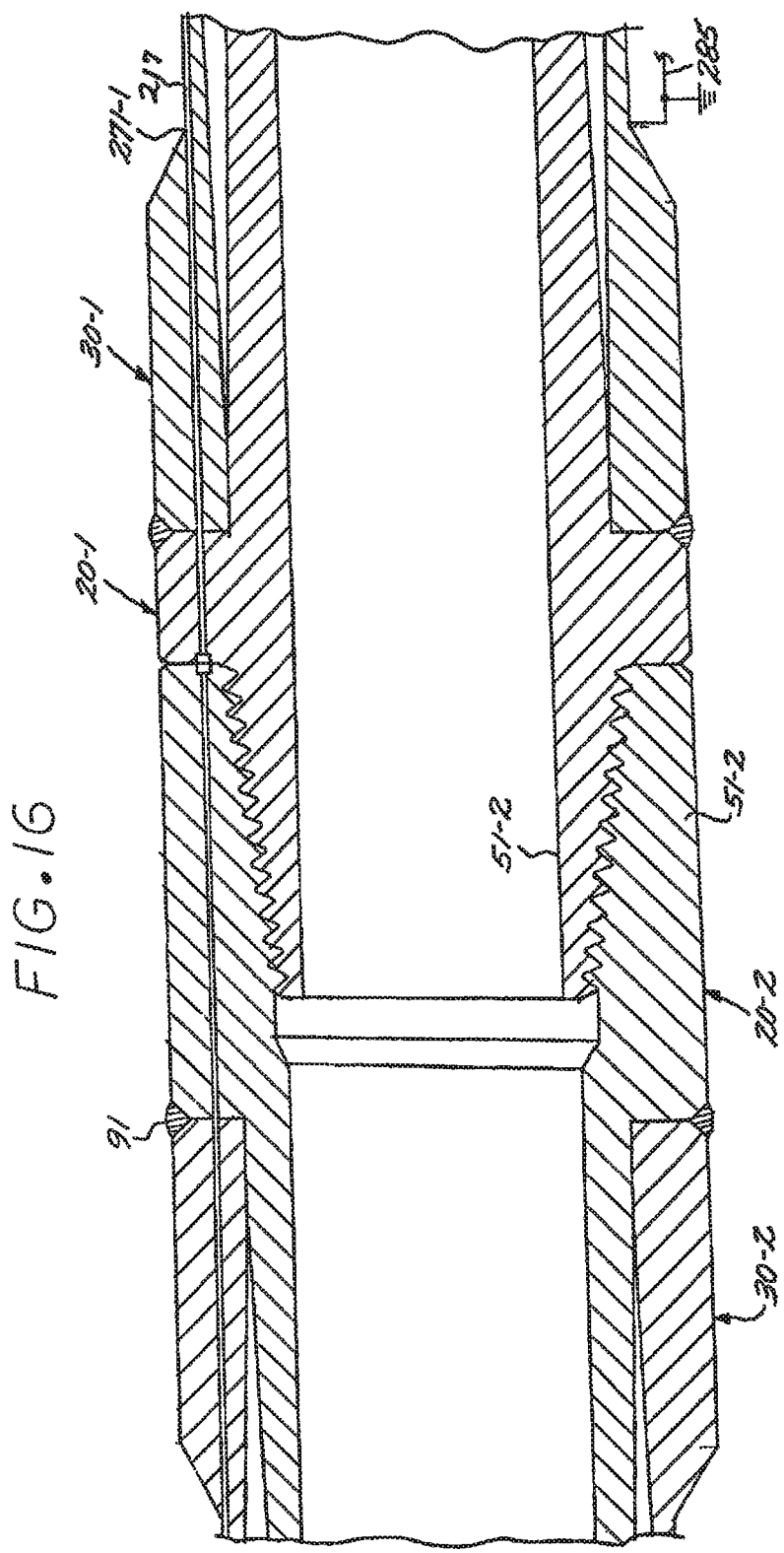
FIG. 16 is a side cross sectional view of the threaded joint interface and contact mechanism shown generally in FIG. 13.

By reference to FIGS. 13-16, a second preferred embodiment employs the interior and exterior distantly converging tapered surfaces at the opposite extremities of the composite segments 11 and showing an alternative contact implementation is obtained by embedding coaxial contact rings in each of the opposing shoulder surfaces 29-1 and 29-2 surrounding both the 'pin' end and the 'box' end of the joint assembly. As will be appreciated by those skilled in the art, one or the other or both of the tapers may be in the form of continuous smooth surfaces as shown in FIGS. 2 and 16 or in some instances in the form of stepped surfaces cooperating to progressively narrow the thickness of the segment wall in the distal direction. Once again, like numbered parts functioning in a manner like that previously described are utilized except that shoulder surfaces 29-1 and 29-2 are each provided with an annular groove 53-1 and 53-2 of a sectional dimension conformed to receive a corresponding elastomeric annular seal 255-1 and 255-2. Seal 255-1 is generally shaped as a U sectioned structure defined by concentric inner and outer annular walls 256*i* and 256*o* extending from a bottom wall 257. A conforming contact ring 261 chamfered along its upper edges by a peripheral chamfer 261*e* is then captured by elastic stretching within the annular cavity 256 formed between the inner and outer sealing walls 256*i* and 256*o* of the seal 255-1 with the outer wall stretching just over the chamfer to retain the ring in position. A similarly dimensioned contact ring 262 is then received in the annular cavity 258 formed between the inner and outer walls 258*i* and 258*o* of the 'box' end seal 255-2, with the groove depth (or wall height) of walls 258*i* and 258*o* being substantially greater than the thickness of the ring 261 and 262 and the depth of the receiving recess 53-2. The height of seal 255-1, in turn, is somewhat less than its receiving recess 53-1. Preferably, both the contact rings 261 and 262 are inserted within their respective seals so that each contact surface projects just slightly above the corresponding surface 29-1 and 29-2, a projection determined by the dimensions of the annular recesses or grooves 53-1 and 53-2 and the dimensions of each seal. Of course, walls 258*i* and 258*o* each project beyond the corresponding surface of ring 262 before the threaded engagement of the joint, as illustrated in FIG. 14.

In this projecting deployment both the opposing seals and the rings seated therein are fixed in rotation in each corresponding recess 53-1 and 53-2 by way of spaced axial pins 263 and 264 that project from the buried edges of each of the rings 261 and 262 into conforming pockets 259 in each of the seal bottoms which are then inserted into conforming cavities 269 formed in the abutment surface bottoms of each of the recesses 53-1 and 53-2 (FIG. 13). The projecting seal edges and the rings therein therefore slide in rotation relative each other as the pipe joint is made. As illustrated in FIG. 15, once the joint is made, the excess volume of the elastomeric matter forming each of the seal walls 258*i* and 258*o* fills the volume of the concentric annular open-ended grooves defined by the respective edge chamfers 261*e* which also assist in the spreading of the seat edges to facilitate a direct contact between the rings as illustrated before the mating in FIG. 14. Thus the edge chamfers in ring 261 allow for the elastomeric material flow of the seal material as the joint is threaded together, ensuring a completely surrounding sealing closure as the exposed edges of the rings are pressed against each other while the smaller contact dimension formed between the edge chamfers 261e assures a better ring contact while also accommodating a somewhat less precise axial registration between the pipe segments. This same material flow may be utilized to both seal and capture the exterior insulation 275e around a conductor 275 extending through corresponding drillings 271-1 and 271-2 through corresponding shoulders 38-1 and 38-2 and extending into one of the cavities 269 in the bottoms of recesses 53-1 and 53-2 to pass the respective lead ends 275 through the seal material and thereafter into perforations 261p and 262p in the corresponding rings 261 and 262. Referring to FIG. 16, a return conductor 285 connected directly between the pipe segment ends can then be utilized to provide the return or common ground. Thus, when environmental resistance is encountered at certain depths, the load carrying capacities of the drill string sections can be adjusted accordingly. In this manner, a rugged and reliable contact is effected, thus accommodating both the power and the signal needs in deep well drilling.

In operation, threaded assemblies may not result in the same two polar points aligning functionally. It may occur that a point on a threaded end does not meet a corresponding point on a receiving end more than once because the boss end may begin at a different point for threading or the degree of torque applied at the end of the threading shifts the points. Those skilled in the art will appreciate that by utilizing contact rings at the end fittings of a threaded pipe assembly, an effective and efficient means for conduction of a signal is maintained even where the conductors are not in direct contact or alignment to one another. It will be seen that the contact rings 262 and 261 will be in conductive engagement regardless of where the conductor 275 is situated on one end piece after threading relative to where the next conductor 275 is on an adjacent segment. Thus, as long as the contact rings are engaged and the conductors are in conductive proximity to the axial pins 263 of their respective contact ring and insulated from electrical diffusion from one another and the surrounding conductive elements, signal can be successfully transmitted from one conductor through the contact ring conjunction to the next conductor.

It will also be appreciated that by using annular seals 255 to incorporate the contact rings 261 and 262, an efficient means of maintaining the conductive integrity is preserved. The annular seal assists in protecting the contact ring from the conductive properties and stress imposed by the metal walls of the pipe end fittings. By sheathing the conductor in an insulation 275e in conjunction with housing the contact rings in the annular seals, signal loss may be prevented from escaping to the pipe exterior. Once the two pipe ends are press fit, further insulation is achieved where the elastomeric flow fills the annular voids within the shoulders 29 of the two ends. By insulating the conductive components of the contact rings from other conductive components, a signal can be transmitted down a line without short. Additionally, as the pipe assembly advances through jagged rock surfaces contacting the drill pipe outer walls, it will be further appreciated that embedding the conductor 275 into the composite pipe segment walls and subsequently into the sleeves 30 and end fittings 20 protects the conductor from frictional contact with the surrounding environment.

It will be further appreciated that each of the conductors may be variously effected either as an electrical power lead, a signal lead or even a fiber optic filament. Of course, known techniques of signal superposition, frequency and/or pulse modulation or other signaling formats can then be effected by these leads to bring out down hole information directly to the rig operator as the drilling is taking place which can then be used to modify, in known techniques, the drilling direction and the cutting rate, commonly referred to as LWD or 'logging while drilling' and MWD or 'measuring while drilling.' In this manner, all the control and pipe compliance conditions can be conveniently accommodated in a pipe string that, because of its light weight, is particularly suited for ultra deep and/or extended reach drilling.

In a third preferred embodiment, it will be understood that for short radius drilling applications such as from offshore oil platforms where the drilling direction is rapidly changed to avoid obstructions or based on a feedback signal, the nested pieces and their respective tapered surfaces may be modified to withstand varying external loads on the pipe joints accommodating flexing during drilling while maintaining a metal-composite interface conducive for carrying a torsional load capacity. For example, the drill string configuration 300 in FIGS. 17 and 18 is similar to the drill string embodiment shown in FIGS. 2-4 except that the longitudinal length of the inner annular sleeves 323 of the metal end fittings 320-1 and 323 are concentric with and project approximately 1 inch beyond the end of the respective outer sleeves 330-2 facilitating flexure at the metal-composite junction. Similar to the embodiment shown in FIGS. 2-4, ends 320 and 330 include the inner and outer annular shells 320-1 and 320-2, respectively, formed with the respective concentric annular sleeves 323 and 330-2 defining respective concentric, annular, confronting, tapered surfaces 332i and 312e expanding distally away from one another to form a conical annular nesting cavity for bonded receipt of tapered surfaces 312i and 312e of respective pipe segment bonding rings 312-1 and 312-2.

Referring to FIG. 17, the end fitting 320-1 is configured with an annular exterior flange 329-1 formed with a first distally facing annular stop shoulder 329-5 and then projects distally to form an annular radially outwardly projecting flange defining a barrel 329-2 and is then stepped down further in diameter to form a second distally facing annular abutment shoulder 329-3 spaced from the shoulder 329-5 and then projects distally to form the shell 323, terminating in a distal extremity 328-2. Additionally, those skilled will recognize that the composite pipe segment 311 can be constructed to include less carbon material providing more flexibility in the composite segment length. Thus, it will be appreciated that the pipe assembly 300 is conducive for providing quick turns while maintaining durable integrity during advancement of drilling.

The outer sleeve 330-2 is configured with a cylindrical outer surface and is formed proximally with an interior cylindrical, stepped down in diameter to form a cylindrically radially inwardly projecting flange defining a collar 330-3 to fit over the barrel 329-2 and is stepped up in diameter to form a distally facing abutment shoulder 329-4 aligned with the shoulder 329-3 to form a combined annular shoulder against which the blunt end of the respective pipe segment rings 312-1 and 312-2 are abutted. The inner sleeve terminates in an extremity projecting distally beyond the distal extremity 338-1 of the outer sleeve. In one embodiment, a weld nut is provided to weld the proximal end of the outer sleeve to the first annular shoulder. The fitting 320 is configured at its proximal end with a boss 320-1 formed with a threaded nipple 320-1. The fitting 320-2 is formed with an internally threaded box 351-2. A bond 338-2 is received in the interface between the outside surface of the pipe 311 and the inner surface 312e and a second bond at the interface between the exterior surface of the pipe and the interior sleeve surface 332i.

In operation, as the drill assembly 300 rotates advancing toward an oil trap, the composite walls and offset metallic end portions provide a flexure point at the metal-composite interface facilitating directional change during short radius turns. Those skilled will recognize that the composite pipe walls are relatively more flexible than the metal end fittings. Thus, upon a relatively rapid change in drilling direction, the composite walls will bend in the direction of the turn and the internal metallic fitting end bends with the composite walls. The external metallic sleeve end, in turn, provides a flex point for the internal metal end fitting and composite wall to bend from while simultaneously supporting the metal-composite joint interface to partially carry torsional loads. As portions of the string advance past short radius turns, the bending loads on the composite walls lessen and the more rigid metal end fitting helps draw the composite walls back to a linear state. Similar to the embodiment shown in FIGS. 2-4, as loads propagate down the drill string and encounter the metallic-composite joint interface, torsional loads once again encounter two extended cross-sectional areas between the metal and composite surfaces and thus, diffuse the loads at the two interfaces. Thus, an appreciable degree of flexibility may be achieved during short radius drilling while providing a durable structure that can return to is rigidity as the pipe string is extracted from its hole.

It will also be recognized that the drilling experience is further enhanced by incorporating the conductor 275 to the pipe assembly 300 without detracting from the efficiency of or compromising the integrity of the assembly structure. As a string travels deeper into earth and the loads continue to mount on the string structure, it will be appreciated that measuring signals sent along the string via the conductor 275 can provide feedback for adjusting rotational speed as well as update the composition of surrounding geological attributes relative to oil proximity. The flexibility of the conductor cooperates with the advancement of the pipe assembly 300, particularly in short radius applications where the conductor can flex right along with the pipe segment during tight turns.

The invention may be embodied in other forms without departure from the spirit and essential characteristics thereof. The embodiments described therefore are to be considered in all respects as illustrative not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

We claim:

1. A metal to composite tube joint, including:

an end fitting configured with an exterior flange having a first outer radius, a barrel distal to the exterior flange and having a second outer radius less than the first outer radius defining a first distally facing annular shoulder at a juncture of the exterior flange and the barrel, the barrel terminating at a distal end to define a second annular shoulder, an inner sleeve projecting further distally to form an inner shell defining a frustoconical outwardly facing bonding surface;

an outer sleeve, the outer sleeve formed proximally with an annular abutment end bearing against the first distally facing annular shoulder, and further formed with a collar fitting over the barrel, and further distally formed with an increased inner radius to form a distally facing abutment shoulder, and still further projecting distally to form an outer shell having a radially inwardly facing bonding surface cooperating with the radially outwardly facing bonding surface to form an annulus therebetween that expands distally from the distally facing abutment shoulder to a distal end of the outer sleeve;

a composite tube constructed with an extremity of reducing thickness in a distal to proximal direction and adapted to conform to and be received in the annulus formed with the inner and outer bonding surfaces; and a bond on the inner and outer surfaces of the extremity to bond to the respective radially inner and outer facing bonding surfaces.

2. The joint of claim 1 that includes:
a bond on the interface between the barrel and collar.

3. The joint of claim 1 that includes:
a weld welding the collar to the flange.

4. The joint of claim 1 that includes:
the extremity with the outer surface tapering distally outwardly.

5. The joint of claim 1 that includes:
the extremity with the inner surface tapering distally inwardly.

6. The metal to composite tube joint of claim 1, wherein the composite tube includes a bonding ring received in the annulus, the bonding ring formed with a blunt tube end abutted against the inner and outer sleeves.

7. The metal to composite tube joint of claim 1, further comprising a pin connecting the inner sleeve and the outer sleeve and passing through the composite tube.

* * * * *